UNITED STATES PATENT OFFICE.

HENRY H. BUCKMAN, OF JACKSONVILLE, FLORIDA.

PROCESS FOR PRODUCING COMPOSITE TITANIUM PIGMENTS.

1,396,924. Specification of Letters Patent. Patented Nov. 15, 1921.

No Drawing. Application filed October 8, 1920. Serial No. 415,556.

*To all whom it may concern:*

Be it known that I, HENRY H. BUCKMAN, a resident of Jacksonville, Florida, being a citizen of the United States, have invented certain new and useful Improvements in Processes for Producing Composite Titanium Pigments, of which the following is a specification.

My present invention relates to so-called composite pigments in which titanium oxid or some titanium compound is precipitated upon or intimately mixed with a compound of some other metal, and methods for deriving such composite pigments from ores or other raw materials of titanium and the other metal or metals whose compounds together with the desired compound of titanium make up the composite pigment.

The object of my invention is to treat simultaneously with the titanium ore or raw material the ore or raw material of the other metal or metals, the compounds of which are to form a part of the finished pigment, and thus to simplify, improve and render more economical the production of such pigments. Under existing methods of manufacture of such composite titanium pigments, a pure salt of titanium must be first produced by a more or less elaborate process, and then from this salt or compound is precipitated upon a purified salt of another metal, such as barium sulfate, the desired titanium compound. The barium sulfate used must be purified from raw materials in an entirely separate process.

It will be seen from the above that under existing methods of manufacture two independent and more or less expensive purifications and preparations of pure salts must be made, and then these two purified salts are combined to make the composite pigment. Sometimes, instead of prepared barium sulfate, prepared salts of magnesium, calcium, aluminum, etc., are used. But in every case these salts must be prepared from more crude natural substances. In other words, as at present manufactured, composite titanium pigments require not only the preparation of a pure titanium salt, but independently of this the preparation of one or more pure salts of the metal or metals to be used with titanium as the remaining constituent or constituents of the composite pigment. To combine these two separate preparations into one operation and thereby increase not only the economy and efficiency of the manufacture but the quality of the composite pigments is the object of my invention.

In order to more fully describe my invention and in order that others skilled in the act may be able to practise the same, I shall give one example of the process which I have invented, although my invention is not limited to the example given. I take one part by weight of ilmenite and two parts of crude barytes and two parts of crushed coke and mix all three together. This mixture I charge into a hot blast furnace. A very fluid melt results. There are two slags formed, one floating on top of the other. One slag carries iron, silica and other impurities of the ore and the ash of the coke. The other slag carries practically all of the titanium and the barium and a small amount of iron and silica. This latter slag is a sulfid melt. The furnace is arranged with two suitable tap holes from which can be tapped practically continuously these two slags, allowing sufficient intervals for the melts to collect and come down from the upper portions of the furnace. That portion of the iron of the ilmenite which is reduced to the metallic state may be periodically tapped off at a lower tap hole. This process could be, of course, carried out in any suitable furnace, but I prefer the blast furnace on account of its greater economy and the advantages of continuous operation. The melt containing the barium and titanium I now dissolve in strong hydrochloric acid. There is left an insoluble residue of silica and other impurities which is filtered off, and the clear acid solution now contains the barium and the titanium. The hydrogen sulfid generated from the sulfid melt by the hydrochloric acid is also largely in this solution and insures the reduction of whatever iron is in the solution. From this solution containing iron only in the reduced state it is possible to precipitate both barium and titanium salts of a pure white color. This reduction of the iron in solution has to be brought about in existing methods by the addition to the solution of hydrogen sulfid or other reducing agents, whereas it will be seen that in my method the hydrogen sulfid is already present, being generated simultaneously with the solution of the barium and titanium of the melt. By the proper diluting and heating of this solution and by the addition of sulfuric acid or some soluble sulfate, I precipitate together barium sulfate and a titanium complex. The precipitate is then ignited and the finished pigment obtained. If sulfuric acid is used as the precipitant, I recover a considerable portion of the regenerated hydrochloric acid, thus increasing the economy of the process.

It will be observed that in the above example, I start with crude ores of both titanium and barium, and by simultaneous treatment both in the furnace and in solution, have avoided the hitherto necessary and expensive separate preparation and purification of the barium salt. Furthermore, my process enables me to precipitate both the barium and the titanium from the same hydrochloric acid solution, wherein they are present as chlorids. This in turn is made possible by my process, above described, of producing a sulfid melt carrying both the barium and titanium in such state as to enable me to dissolve them simultaneously by hydrochloric acid. It should be noted that in all existing methods of preparing composite pigments the titanium is first prepared in sulfate solution, while in my process it is first prepared in a chlorid solution. In my method the titanium is precipitated as well as the barium by the addition of an acid, while in other methods the precipitation is brought about by the addition of a base. It is possible by my method to produce a truly simultaneous precipitation of the barium and at least a portion of the titanium. For these reasons, and because of the already exceptional purity of the salts present and the small amount of thoroughly reduced iron present, the composite precipitate which is formed when sulfuric acid is added to my solution properly diluted and heated is whiter, finer and more opaque than other composite titanium precipitates of a corresponding nature. The properties and behavior of this precipitate indicate that it is new and different from and superior to similar composite precipitates heretofore produced.

In the above example, I have used barium as the metal to furnish the accompanying salt for the titanium complex acid in the composite precipitate. I have also used with good results calcium, starting with crude salts such as gypsum. It is not necessary that sulfates be used, but it is necessary to provide in the charge sufficient sulfur, either free or combined, to form a sulfid slag or melt sufficient to accommodate both the titanium and the base metal. I prefer to use sufficient carbon to insure a good reducing atmosphere in the furnace and a reduction of any sulfates to sulfids.

It will be seen that my process and invention comprises the simultaneous reduction of ilmenite ore and the ore or raw material of the metal or metals to accompany the titanium in the composite pigment not to the metallic state but to a common sulfid slag or melt from which all the metals which are to appear in the pigment are taken into acid solution and precipitated from this solution in the form of pure salts to form the composite precipitate, which, after ignition or further suitable treatment becomes the pigment. Thus is achieved a better pigment in one process than has been hitherto produced by two separate processes, hence I believe my invention to be a new and useful advance in the art.

Having now described my invention, what I claim as new and desire to secure by Letters Patent is the following:

1. The process of obtaining composite titanium pigments which comprises heating together with carbon and sulfur a titanium-bearing material and a solid, inorganic compound of the metal which is to accompany titanium in the pigment, subjecting the resulting sulfid melt to the action of an acid solvent, precipitating from the resulting solution both titanium and the accompanying metal and subsequently roasting the precipitate.

2. The process of obtaining composite titanium pigments which comprises heating together with carbon a titanium-bearing material and a sulfur compound of the metal which is to accompany titanium in the pigment, subjecting the resulting sulfid melt to the action of an acid solvent, precipitating from the resulting solution both titanium and the aforesaid accompanying metal, and subsequently roasting the precipitate.

3. The process of obtaining composite titanium pigments which comprises heating together with carbon a titanium-bearing material and a sulfate of the metal which is to accompany titanium in the pigment, subjecting the resulting sulfid melt to the action of an acid solvent, precipitating from the resulting solution both titanium and the aforesaid accompanying metal, and subsequently roasting the precipitate.

4. The process of obtaining composite titanium pigments which comprises heating together with carbon ilmenite and barium sulfate, subjecting the resulting sulfid melt to the action of hydrochloric acid, precipitating from this hydrochloric acid solution by the addition of heat and sulfuric acid both a titanium complex and barium sulfate, and subsequently roasting the precipitate.

5. The process of obtaining composite titanium pigments which comprises heating together with carbon ilmenite and barium sulfate, subjecting the resulting sulfid melt to the action of hydrochloric acid, precipitating from this hydrochloric acid solution by the addition of heat and a soluble sulfate both a titanium complex and barium sulfate and subsequently roasting the precipitate.

6. As a new article, the hereinbefore described roasted composite precipitate, consisting essentially of oxygen compounds of titanium associated with sulfate of barium and distinguished as being a smooth, fine white powder, of exceptional pigmenting and bulking power.

7. As a new article, the hereinbefore described composite precipitate, consisting essentially of titanium complexes associated with barium sulfate, and distinguished as being a smooth, fine white powder, of exceptional pigmenting and bulking power.

HENRY H. BUCKMAN.